US007513398B2

(12) United States Patent
Miller

(10) Patent No.: US 7,513,398 B2
(45) Date of Patent: Apr. 7, 2009

(54) BEVERAGE DISPENSE VALVE

(75) Inventor: Simon Robert Miller, West Midlands (GB)

(73) Assignee: Scotsman Beverage Systems Limited, West Midlands (GB)

( * ) Notice: Subject to any disclaimer, the term of this patent is extended or adjusted under 35 U.S.C. 154(b) by 122 days.

(21) Appl. No.: 11/694,148

(22) Filed: Mar. 30, 2007

(65) Prior Publication Data

US 2007/0228315 A1 Oct. 4, 2007

(30) Foreign Application Priority Data

Mar. 30, 2006 (GB) ................................ 0606378.8
Mar. 30, 2006 (IE) .............................. S2006/0250

(51) Int. Cl.
*F16K 51/00* (2006.01)

(52) U.S. Cl. ....................... 222/547; 251/118; 251/343; 251/344

(58) Field of Classification Search ................. 251/343, 251/344, 345, 122, 121; 222/547, 503
See application file for complete search history.

(56) References Cited

U.S. PATENT DOCUMENTS

| | | | | |
|---|---|---|---|---|
| 3,291,441 | A * | 12/1966 | Hansen | 251/122 |
| 4,078,578 | A * | 3/1978 | Buchholz | 251/122 |
| 4,271,992 | A * | 6/1981 | Becker | 251/354 |
| 4,708,155 | A * | 11/1987 | Austin et al. | 251/282 |
| 4,742,942 | A * | 5/1988 | Dokos et al. | 222/547 |
| 5,244,117 | A * | 9/1993 | Lombardo | 222/505 |
| 5,503,179 | A | 4/1996 | Till | |
| 5,529,281 | A * | 6/1996 | Brudnicki et al. | 251/65 |
| 6,041,970 | A * | 3/2000 | Vogel | 251/120 |
| 6,116,571 | A * | 9/2000 | Hettinger | 251/129.2 |
| 6,361,018 | B2 * | 3/2002 | Roth et al. | 251/344 |
| 6,457,614 | B1 * | 10/2002 | Amidzich | 222/547 |
| 6,478,200 | B1 | 11/2002 | Davis | |
| 2004/0222400 | A1 * | 11/2004 | McCarty et al. | 251/344 |
| 2005/0230655 | A1 * | 10/2005 | Chen | 251/344 |

FOREIGN PATENT DOCUMENTS

| | | | |
|---|---|---|---|
| BE | 1015850 | A3 | 10/2005 |
| DE | 4202633 | A1 | 3/2007 |
| EP | 1238941 | A1 | 2/2002 |
| GB | 1339976 | A | 12/1973 |

* cited by examiner

*Primary Examiner*—John Bastianelli
(74) *Attorney, Agent, or Firm*—Lowell W. Gresham; Jordan M. Meschkow; Gouri G. Nair

(57) ABSTRACT

A beverage dispense valve having a valve body; a female taper member inside the valve body and defining an internal chamber; the internal diameter of the chamber increasing in a downstream direction away from the inlet port, a male taper member having a taper portion receivable in said internal chamber, the external diameter of the taper portion increasing in a downstream direction so as to be at least partially complementary to the female taper member, and having a hollow outlet portion downstream of the taper portion, one taper member being slidable relative to the other so that a flow passageway can be formed in an annular gap between them, the flow passageway providing a restrictive diffusing flow path and the two taper members forming a flow regulator; a valve closure arrangement, and an actuating mechanism outside the valve body to operate both the flow regulator and the valve closure arrangement.

21 Claims, 5 Drawing Sheets

Section A-A

Section B-B

Section A-A

Section A-A

BEVERAGE DISPENSE VALVE

FIELD OF THE INVENTION

The present invention relates to a Beverage Dispense Valve, in particular, a Combination Piston Taper Valve which simultaneously controls the flow rate of a liquid through the valve in unison with the opening and closing of the valve. It is useful, inter alia, in the field of beverage dispense equipment, particularly for dispensing beers and soft drinks, especially draught beers and carbonated soft drinks that are temperature controlled and are supplied from a pre-mixed or post-mixed pressurised container. The background of the invention will be discussed with reference to a Beverage Dispensing Tap [BDT] for dispensing pressurised carbonated beverages, but the invention is not so limited.

BACKGROUND TO THE INVENTION

Beverage Dispense Taps [BDTs] with a slidable sealed piston valve or a spring-loaded tensioned sealed piston valve are commonly known. The handle for opening and closing the flow through the BDT is usually attached to the tap body so that the handle movement communicates a cam surface with the piston valve to move the piston valve from the closed position to the open position. When the piston valve is in the closed position a seal is engaged to ensure no pressurised liquid can flow through the BDT. When the handle is actuated to the open position the seal is disengaged from its seat to allow liquid to flow around the piston valve and through the outlet port of the BDT into the glass. The handle moves the piston valve from the closed to open position creating a liquid conduit between the beverage inlet and the beverage outlet. In these designs there is no diffusion of the liquid flow as the BDT opens. The liquid is pressurised at the specific dispense pressure when the BDT is in the closed position and immediately de-pressurised as the BDT handle is moved to the open position. When the BDT is opened there is a rapid drop in pressure which can lead to excessive fobbing and subsequently waste beer. In such BDTs the handle can be located vertically or horizontally and similarly in alignment with the actuated directional movement of the piston valve.

In BDTs that dispense pressurised carbonated liquids, it is preferable to have a means of adjustment to control the velocity of the liquid flow through the BDT to ensure that the beverage is dispensed at a preferred flow rate. The preferred flow rate is determined as that which is suitable for producing a pre-defined final presentation of the beverage in the glass in relation to pouring speed and appearance, particularly in relation to the formation of the frothy head on the top of the beverage. The need for adjustment is due to the physical variables within pressurised dispense systems, particularly the following;

- the relative volume of gas to liquid in the beverage,
- the temperature variations in the system affecting the carbonation of the beverage,
- the dispense pressure applied to the beverage container,
- the distance of the supply line and the vertical elevation from the beverage container to the BDT,
- the atmospheric pressure at the system location.

All pressurised carbonated beverage dispense systems require equilibrium of pressure to be maintained between the container and the BDT to ensure the achievement of a suitable final presentation of the beverage in the glass. It is commonly known that the most suitable means of adjusting the liquid flow at the BDT is by means of a needle taper valve which incorporates a male taper needle valve with externally accessible adjustment means, the male taper being aligned within a female taper body having a matching taper form, that creates a parallel annular gap between the male and female tapers as the male is adjusted. When the male taper is fully inserted into the female taper the annular gap is either nil, so that the tapers form a surface seal or that the gap between the tapers is diminutive so as to restrict liquid from flowing through the valve. In this position the restriction between the two tapers is at its highest and the liquid flow rate is stopped or at its slowest. Likewise when the male taper is extended outward from the female taper the annular gap between the tapers increases, creating an increase in volume between the tapers, reducing the restriction and allowing the liquid flow rate to increase in a proportionate ratio to the dispense pressure propelling the liquid. In this position the gap between the two tapers is at the highest and the liquid flow rate is increased.

The needle taper valves currently in use to control flow rates are located in close proximity to the BDT, ideally attached to the inlet portion of the BDT or as an integral component of the BDT construction. In these constructions the means to adjust the needle taper valve is independent to the actuation of the tap handle and the opening and closing of the BDT. The operation of the BDT to pour the beverage can involve three physical actions, firstly the opening of the BDT through the movement of the handle, secondly the adjustment of the flow rate through the independent needle taper valve and thirdly the closing of the BDT through the return movement of the handle. This action is required whilst the operator of the tap also holds the glass into which the beverage is pouring.

In the current market for dispensing carbonated beverages, particularly draught beer, there is an increasing desire to dispense at faster pouring speeds to ensure maximum revenue can be achieved in limited peak drinking periods. The method of pouring fast requires experienced bar staff operators as the faster the flow the more difficult it is to control the gas breakout during the pour, leading to high levels of waste beer due to excessive head formation creating fobbing in the glass. The market need to pour faster is exacerbated by the lack of trained bar staff and the high turnover of staff in this service provision. In such instances the existing BDTs and their method of operation do not adequately meet the changing market needs and this invention is proposed as an alternative solution.

It is an object of the present invention to provide a novel Beverage Dispense Valve that when used to dispense pressurised carbonated beverages reduces or eliminates the problems described herein by providing a reliable, user-friendly BDT which is convenient to the changing market needs of faster pouring and lack of operator skills to ensure that pressurised carbonated beverages can be poured successfully at faster pouring speeds without excessive fobbing waste and without specialised operator training.

U.S. Pat. No. 6,478,200 B1 Davis describes a beverage dispense device comprising:

1. a valve body,
2. a nozzle or spout,
3. a valve comprising a valve seat and a closure member, the valve being opened and closed by movement of the closure member out of and into contact with the valve seat to allow or prevent flow of the beverage into a conically shaped flow passage way within the body,
4. a flow regulator between the valve seat and the nozzle, the flow regulator being adjustable to control flow rate through the nozzle and being in the form of a core member moveable in the conically-shaped flow passageway downstream of the valve seat and spaced from the valve seat, the core member and the flow passageway having matching tapering surfaces, and 5. the nozzle or spout being formed as an integral unit with the core and moveable upwardly and downwardly within an annular extension which depends downwardly of the valve body, the nozzle or spout sealingly engaging the inner wall of the extension by means of an annular seal which is held in a corresponding groove in the surface of the nozzle or spout. The annular seal is below ports which penetrate through the wall thickness of the flow regulator to allow beverage to flow to an outlet defined through the nozzle or spout. Therefore the annular seal is to prevent leakage of beverage and does not prevent its flow to the outlet.

In the embodiment as described and illustrated, the closure member of the valve is an armature which is operated by a solenoid to cause it to move upwardly (upstream) out of contact with the valve seat and (downwardly) downstream into contact with the valve seat. The core member of the flow regulator below (downstream of) the valve seat is adjustable upwardly or downwardly within the flow passageway by separate screw-threaded means. The text suggests that in an alternative embodiment the adjustment may be by means of a stepper motor, for example, and where a stepper motor is used for this purpose it may have the dual function of opening and closing the valve. Another part of the text suggests that the adjustment means for the flow regulator may be a stepper motor and the valve seat may be achieved by direct contact between the core and the wall of the flow passageway. However there is no description or drawing to show how this could work in practice The valve closure member and the flow regulator are two separate components with different movements. Furthermore the description at column 1 lines 60-63 emphasises that the flow regulator is downstream of the valve and effectively provides a back pressure to the beverage being dispensed and thereby provides an adjustable pressure drop to which the beverage is subjected when the valve is opened. There is no description to explain how the core of the flow regulator could be downstream of the valve and yet simultaneously be achieving the valve seat by contact with the wall of the flow passageway.

GB 1,486,245 Leroy describes a valve member that is moveable along with a frusto-conical core member to permit both variation of the restrictor passage and opening/closing of the faucet with a single actuator. The valve member is located at the upstream end of the frusto-conical core member and comprises an annular shoulder on the core member positioned to mate with a similar shoulder on the annular valve seat at the inlet end of the chamber. An O-ring is placed on the core member shoulder to assure a pressure seal in the off position of the valve. However the valve opening is reported to serve as a “pinch point” which causes the liquid to froth immediately downstream of it. Furthermore, the liquid flow is re-directed through many planes in a constrained chamber area in order to exit the spout. The re-direction of flow of liquid through so many planes in a constrained chamber area creates turbulence and can lead to cleaning difficulties.

U.S. Pat. No. 5,244,117 Lombardo discloses a single actuator dispenser valve wherein a frusto-conical core member has a rounded tip that seals the inlet opening at the narrow end of the frusto-conical valve chamber when the valve is closed. However this arrangement also places the valve upstream of the diffusing passage between the core member and the wall of the flow passageway.

In each of the previously cited patents the flow regulator is positioned downstream of the main valve seal. In practice this configuration does not effectively regulate the flow as the positioning of the regulator must be before the valve seal to ensure that the regulator can maintain an effective back pressure in the carbonated beverage to ensure that the carbonated beverage retains its pressurised characteristics prior to the egress at the valve seal where the carbonation is allowed to break out naturally to an atmospheric conduit or nozzle and into the beverage container.

U.S. Pat. No. 5,538,028 Lombardo describes a valve which includes a frusto-conical valve member disposed in a similarly configured frusto-conical chamber section to both define a restrictive diffusing flow path when the valve is open and the sole pressure seal when the valve is closed. The pressure seal is created along a substantial length of the core member which is preferably made of resiliently compressible plastic to enhance the seal. However this arrangement involves a risk of leakage of beverage past the seal. Furthermore, baffles are used in the outlet spout to control eddying. Eddying is a turbulent condition created by the multi-directional flow path in which the liquid has to flow at the larger end of the conical taper, in that liquid entering the concave annular recess is directed into a vortex by the nature in which it has to flow around this annular recess to exit at the lower portion into the spout. Thus the flow rate is not equalised in this arrangement as the velocity of flow is greater at the lowest point of the frusto-conical concave annular recess, where the spout is positioned, whereas the flow at the highest point is decelerated, as it is required to flow around this concave annular recess before exiting into the spout.

It is an object of the present invention to provide a dispense tap having a combined valve and flow control with the flow control upstream of the valve. It is also an object of the invention to provide a device having a practical arrangement for operating both the valve and the flow regulator with a single control.

SUMMARY OF THE INVENTION

In one aspect, the invention provides a beverage dispense valve comprising (i) a valve body;

(ii) a female taper member inside the valve body and defining an internal chamber in fluid communication with a beverage inlet port and a beverage outlet port; the internal diameter of the chamber increasing in a downstream direction away from the beverage inlet port;

(iii) a male taper member having a taper portion receivable in said internal chamber, the external diameter of the taper portion increasing in a downstream direction so as to be at least partially complementary to the female taper member, and having a hollow outlet portion downstream of the taper portion, one taper member being slidable relative to the other so that a flow passageway can be formed in an annular gap between them, the flow passageway providing a restrictive diffusing flow path for beverage and the two taper members forming a flow regulator;

(iv) one or more apertures penetrating through the male taper member to allow beverage to pass from the flow passageway into the interior of the outlet portion, (v) a valve closure arrangement for sealing flow between the beverage inlet port and the beverage outlet port; and (vi) an actuating mechanism outside the valve body to operate both the flow regulator and the valve closure arrangement; wherein said valve closure arrangement is located at or adjacent to the maximum external diameter of the male taper member so that in its closed position the closure arrangement seals the flow passageway at the downstream end of the diffusing flow path but upstream of the apertures(s) which penetrate through the male taper member.

In the beverage dispense valve according to the invention, the flow regulator is upstream of the valve closure arrangement. This arrangement ensures that the rate of flow is regulated right up to the point of the valve seal opening, so as to ensure that the velocity of flow is gradually and optimally increased as the flow regulator and valve seal are moved in tandem at the opening and closing operation through the actuation of the handle.

The beverage dispense valve according to the present invention provides a linear flow path through the outlet portion of the male taper member to the beverage outlet port. By this arrangement, the flow of beverage does not have to be redirected from the flow passageway to the beverage outlet port.

In this specification and claims, the terms “upstream” and “downstream” are used in relation to the flow of liquid from the entry point of the beverage dispense valve (“upstream”) to the exit point of the beverage dispense valve (“downstream”).

Suitably, the valve closure arrangement comprises a resilient sealing member protruding from the male taper member at or adjacent to its maximum diameter to seal against a valve seat on the chamber wall of the female taper member. The resilient sealing member may comprise an O-ring.

Suitably the valve closure arrangement further comprises an annular recess in the chamber wall of the female taper member at or adjacent to the maximum internal diameter of the chamber, the recess providing a shoulder on its upstream rim, so that in the closed position the resilient sealing member seals against the shoulder and in the open position the flow passageway extends past the sealing member in the gap defined by the recess.

Alternatively, the valve closure arrangement may comprise a resilient sealing member protruding from the female taper member at or adjacent to its maximum internal diameter to seal against the maximum external diameter of the male taper member. In the closed position the valve forms a seal between the maximum internal diameter of the chamber of the female taper member and the maximum external diameter of the male taper member, sealing the flow passageway at the downstream end of the diffusing flow path but upstream of the aperture(s) which penetrate through the male taper member.

The beverage dispense valve described herein therefore provides an effective design due to the location of the valve seat adjacent to the final egress point in the valve body. Liquid is allowed to flow uninterrupted around the taper area. The valve seat releases beverage into an open aperture that does not form part of the taper restrictor liquid flow path. A smooth taper flow path is provided allowing smooth flow along the restrictive diffusing flow path. The beverage dispense valve according to the present invention allows the flow rate of liquid passing through the valve to be equalised.

In one embodiment of the invention, the female taper member is moveably located within the valve body and the male taper member is fixed to the valve body.

Suitably the actuating mechanism comprises a handle assembly mechanism. The handle assembly mechanism is operable from outside the valve body to operate both the flow regulator and the valve closure arrangement simultaneously. The beverage dispense valve according to the invention is easier to operate than known systems and is therefore more user friendly.

Desirably, the valve body has an opening through which the handle assembly mechanism engages the moveable female taper member.

Suitably, the handle assembly mechanism is adapted to operate both the flow regulator and the valve closure arrangement by means of angular rotation of the handle assembly mechanism relative to the valve body. The beverage dispense valve may be mounted in a vertical orientation.

Suitably the handle assembly mechanism comprises a handle having an end portion which passes through an opening in the valve body to engage said female taper member. Preferably, the valve body has a helical or angular slot through which the end portion of the handle can pass.

Preferably, the exterior surface of the female taper member comprises a recess for engagement with the end portion of the handle.

Suitably, the end portion of the handle comprises a cam follower for co-operation with the helical slot and a pin for engagement with the female taper member such that on rotation of the handle, the cam follower is guided by the helical slot and the pin engages the recess on the external surface of the female taper member such that the female taper is moved upstream or downstream and rotated as the cam follower moves along the helical slot. The handle assembly mechanism therefore permits gradual opening and closing of the valve together with controlled movement of the flow regulator. The operator can therefore operate the valve and control the flow of beverage with relative ease compared to known systems.

Preferably, the beverage dispense valve has a shroud outside the valve body on which the handle is mounted. Suitably the shroud is rotatable about the valve body. By this arrangement, the shroud rotates about the valve body on rotation of the handle. The handle may be mounted in the shroud by means of threaded engagement or by any other suitable means known in the art.

In an alternative embodiment, the handle mechanism assembly is adapted to operate both the flow regulator and the valve closure arrangement by means of linear movement of the handle relative to the valve body. In this embodiment the handle assembly mechanism comprises a handle having an end portion which passes through an opening in the valve body to engage the female taper member. Suitably the valve body has a concave cam surface adapted to receive the end portion of the handle mechanism assembly.

Preferably the exterior surface of the female taper member comprises a recess for engagement with the handle mechanism assembly.

In this alternative embodiment, the end portion of the handle comprises a cam for co-operation with the concave cam surface of the valve body and a pin extending from said cam for engagement with the female taper member such that on linear movement of said handle, the cam pivots in the concave cam surface and the pin engages the recess on the external surface of the female taper member such that the female taper is moved upstream or downstream as the cam pivots in the concave cam surface. By this arrangement the operator can open or close the valve and simultaneously control the rate of flow of the beverage by moving the handle in a forwards or backwards direction relative to the valve body.

The beverage dispense valve according to the invention suitably comprises a beverage dispense spout fixed to the male taper member forming a male taper/spout assembly.

In an alternative embodiment the male taper member is fixed to the spout forming a male taper/spout assembly and the female taper member is fixed to the valve body; the male taper member/spout assembly being slidable relative to the female taper member, wherein the actuating mechanism is adapted to operate both the flow regulator and valve closure arrangement by moving the male taper member/spout assembly relative to the fixed female taper member.

In a preferred embodiment, the invention provides a beverage dispense valve comprising (i) a valve body;

(ii) a female taper member inside the valve body and defining an internal chamber in fluid communication with a beverage inlet port and a beverage outlet port; the internal diameter of the chamber increasing in a downstream direction away from the beverage inlet port;

(iii) a male taper member having a taper portion receivable in said internal chamber, the external diameter of the taper portion increasing in a downstream direction so as to be at least partially complementary to the female taper member, and having a hollow outlet portion downstream of the taper portion, one taper member being slidable relative to the other so that a flow passageway can be formed in an annular gap between them, the flow passageway providing a restrictive diffusing flow path for beverage and the two taper members forming a flow regulator;

(iv) a valve closure arrangement for sealing flow between the beverage inlet port and the beverage outlet port; and (v) an actuating mechanism outside the valve body to operate both the flow regulator and the valve closure arrangement, wherein the female taper member is moveably located within the valve body and the male taper member is fixed to the valve body.

Preferably the actuating mechanism is a handle assembly mechanism. The handle assembly mechanism is operable from outside the valve body allowing the operator to open and close the valve while simultaneously controlling the flow rate of beverage through the valve.

Suitably the valve body has an opening through which the handle assembly mechanism engages the moveable female taper member.

In one aspect of this embodiment of the invention the handle assembly mechanism is adapted to operate both the flow regulator and the valve closure arrangement by means of angular rotation of the handle relative to the valve body. The beverage dispense valve may be mounted in vertical orientation.

Suitably the handle assembly mechanism comprises a handle having an end portion which passes through an opening in the valve body to engage said female taper member. The valve body has a helical or angular slot through which the end portion of the handle can pass.

Preferably the exterior surface of the female taper member comprises a recess for engagement with the end portion of the handle.

In this embodiment the end portion comprises a cam follower for co-operation with the helical slot and a pin for engagement with the female taper member such that on rotation of the handle, the cam follower is guided by the helical slot and the pin engages the recess on the external surface of the female taper member such that the female taper is moved upstream or downstream and rotated as the cam follower moves along the helical slot. This arrangement enables the operator to simultaneously control the flow rate of liquid through the valve in unison with the opening and closing of the valve. The beverage dispense valve according to the invention therefore avoids the need for a separate actuating mechanism for controlling the flow regulator.

In an alternative aspect of this embodiment of the invention the handle mechanism assembly is adapted to operate both the flow regulator and the valve closure arrangement by means of linear movement of the handle relative to the valve body. The beverage dispense valve may be mounted in a horizontal orientation.

Preferably the handle assembly mechanism comprises a handle having an end portion which passes through an opening in the valve body to engage said female taper member.

Suitably the valve body has a concave cam surface adapted to receive the end portion of the handle. In this arrangement the exterior surface of the female taper member comprises a recess for engagement with the end portion of the handle.

Suitably the end portion of the handle comprises a cam for co-operation with the concave cam surface of the valve body and a pin extending from said cam for engagement with the female taper member such that on linear movement of said handle, the cam pivots in the concave cam surface and the pin engages the recess on the external surface of the female taper member such that the female taper is moved upstream or downstream as the cam pivots in the concave cam surface. This arrangement allows the operator to simultaneously control the rate of flow of liquid through the valve in unison with opening and closing the valve on linear movement of the handle in a forwards or backwards direction relative to the valve body.

The beverage dispense valve further comprises one or more apertures penetrating through the male taper member to allow beverage to pass from the flow passageway into the interior of the outlet portion. A linear flow path is provided through the outlet portion of the male taper member to the beverage outlet port. By means of this arrangement the flow of liquid does not have to be redirected from the flow passageway into the beverage outlet port.

In this embodiment the valve closure arrangement is located at or adjacent to the maximum external diameter of the male taper member so that in its closed position the closure arrangement seals the flow passageway at the downstream end of the diffusing flow path but upstream of the apertures(s) which penetrate through the male taper member. The flow regulator is located upstream of the main valve seal. In this arrangement, the flow rate of the liquid is equalised. This arrangement ensures that the rate of flow is regulated right up to the point of the valve seal opening, so as to ensure that the velocity of flow is gradually and optimally increased as the flow regulator and valve seal are moved in tandem at the opening and closing operation through the actuation of the handle.

The valve closure arrangement suitably comprises a resilient sealing member protruding from the male taper member at or adjacent to its maximum diameter to seal against a valve seat on the chamber wall of the female taper member. The resilient sealing member may suitably comprise an O-ring. Alternatively, other compressible or liquid tight sealing means known in the art could be used.

Preferably the valve closure arrangement further comprises an annular recess in the chamber wall of the female taper member at or adjacent to the maximum internal diameter of the chamber, the recess providing a shoulder on its upstream rim, so that in the closed position the resilient sealing member seals against the shoulder and in the open position the flow passageway extends past the sealing member in the gap defined by the recess.

Alternatively, the valve closure arrangement may comprise a resilient sealing member protruding from the female taper member at or adjacent to its maximum internal diameter to seal against the maximum external diameter of the male taper member. By this construction, the valve when in the closed position forms a seal between the maximum internal diameter of the female taper member and the maximum external diameter of the male taper member, sealing the flow passageway at the downstream end of the diffusing flow path but upstream of the aperture(s) which penetrate through the male taper member.

Suitably, in the beverage dispense valve described herein, the female taper member is slidable within the valve body and forms a seal on its internal tapered diameter with said fixed male taper member of similar angle in the range 10 to 18 degrees, preferably 13 to 15 degrees.

Preferably, the beverage dispense valve according to the preferred embodiment further comprises a shroud outside the valve body on which the handle is mounted, said shroud being rotatable about the valve body. In this arrangement, the shroud rotates about the valve body on rotation of the handle. The handle may be mounted in the shroud by means of threaded engagement or by any other suitable means known in the art.

Some non-limiting embodiments of the invention in its various aspects will be further described below by way of example with reference to the drawings.

BRIEF DESCRIPTION OF THE DRAWINGS

The invention will now be described with reference to the accompanying drawings.

The first embodiment of the invention described is the beverage dispense tap mounted in the vertical orientation and is described with reference to the following figures in which:

FIG. 8 is a front elevation of the Beverage Dispense Tap [BDT] in the closed position;

FIG. 9 is a vertical cross-section of the valve body portion of the BDT in the closed position on a line equivalent to A-A in FIG. 8;

FIG. 10 is a front elevation of the BDT in the open position;

FIG. 11 is a vertical cross-section of the valve body portion of the BDT in the open position on a line equivalent to A-A in FIG. 10.

DETAILED DESCRIPTION OF THE DRAWINGS

While the embodiments of the present invention described and shown in the accompanying drawings involve movement of the female taper member relative to the fixed male taper member, it will be appreciated that it would be possible to have the female taper member fixed to the valve body of the tap and to move the male taper member by external means as known in the art, for example GB 2117094 and other prior art as discussed above. In that case the female taper member may be part of the valve body. It is preferable however, that the female taper member is movable relative to the fixed male taper member, in which case the female taper member will also be moveable inside the valve body.

The invention described herein defines two alternative location orientations, either vertical or horizontal. The beverage dispense tap is constructed in two alternative arrangements to allow either vertical or horizontal orientation and to facilitate attachment to all known and possible beverage supply housing configurations. In both orientations the beverage dispense valve has the same main components as discussed below. In the horizontal orientation the preferred method of opening and closing the handle is in a linear plane to the slide-able female taper. However either rotary or linear movement of the actuating mechanism could be used in either orientation.

Figure 1:
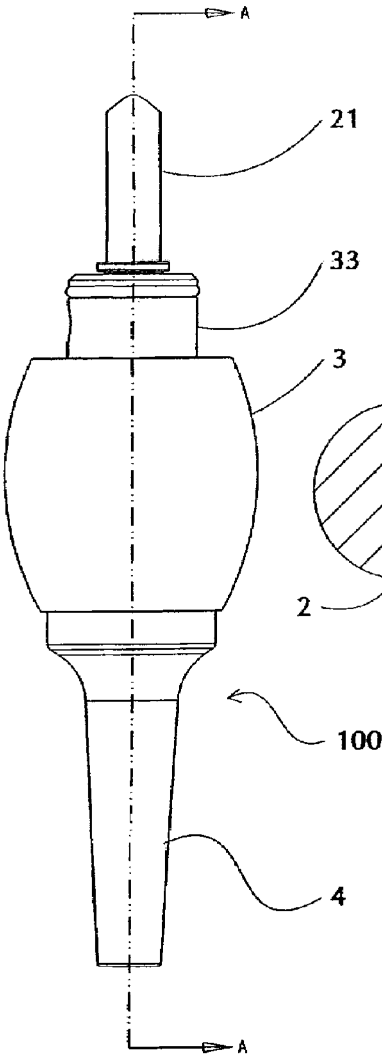
FIG. 1 is a front elevation of the Beverage Dispense Tap [BDT] in the closed position.
Figure 2:
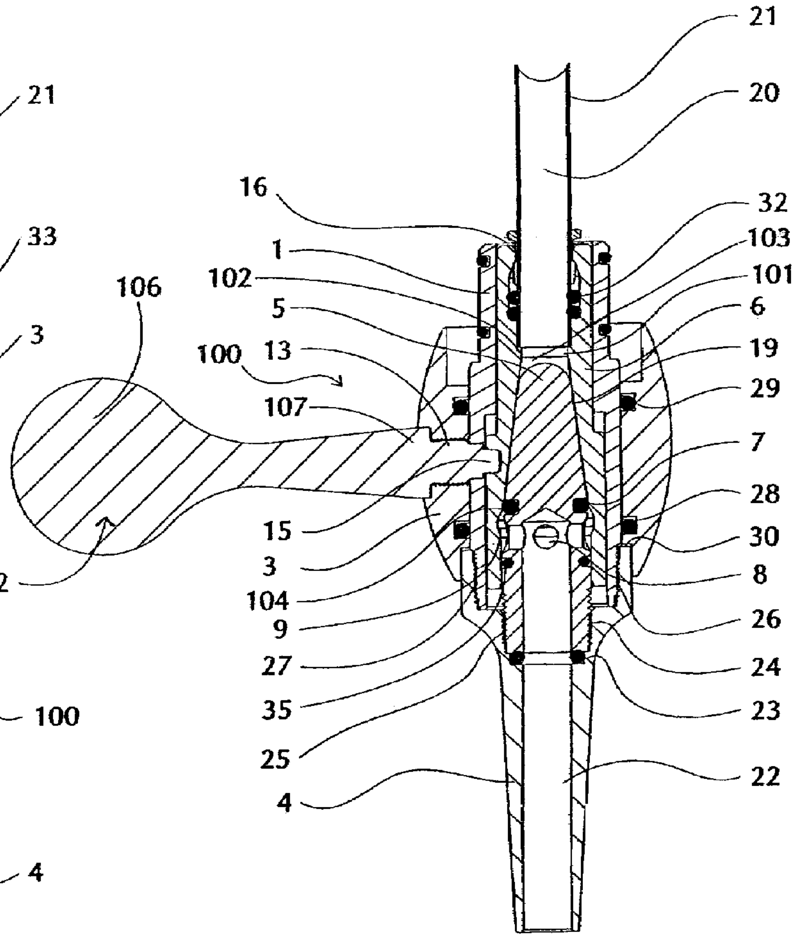
FIG. 2 is a vertical cross-section of the BDT in the closed position, on a line equivalent to A-A in FIG. 1.

FIG. 1 shows a front elevation of the beverage dispense tap [BDT] 100 according to the first embodiment of the present invention. The BDT is shown in the closed position. FIG. 2 shows a vertical cross-section of the BDT in the closed position on a line equivalent to A-A in FIG. 1.

As shown in FIGS. 1 to 5, the tap body is connected to a beverage supply line 21 and a beverage outlet 22 through a pouring spout 4. The BDT 100 comprises a valve body 1 having a female taper member 6 inside the valve body 1. The female taper member 6 defines an internal chamber 101 which is in fluid communication with the beverage inlet port 16, 17 of the female taper and the beverage outlet flow 22 through the pouring spout 4. In the embodiment shown, a beverage supply line 21 is connected to the female taper 6 by means of a John Guest collet 37 adjacent the beverage inlet port 16, 17. The skilled person will appreciate that alternative means known in the art could be used to connect the beverage supply line to the valve body. The female taper member 6 is provided with a pair of seals 32 for sealing the beverage supply line 21 into the female taper 6. In the embodiment shown the beverage supply line 21 is sealed into the female taper 6 by means of a pair of o-ring seals 32.

Figure 4:
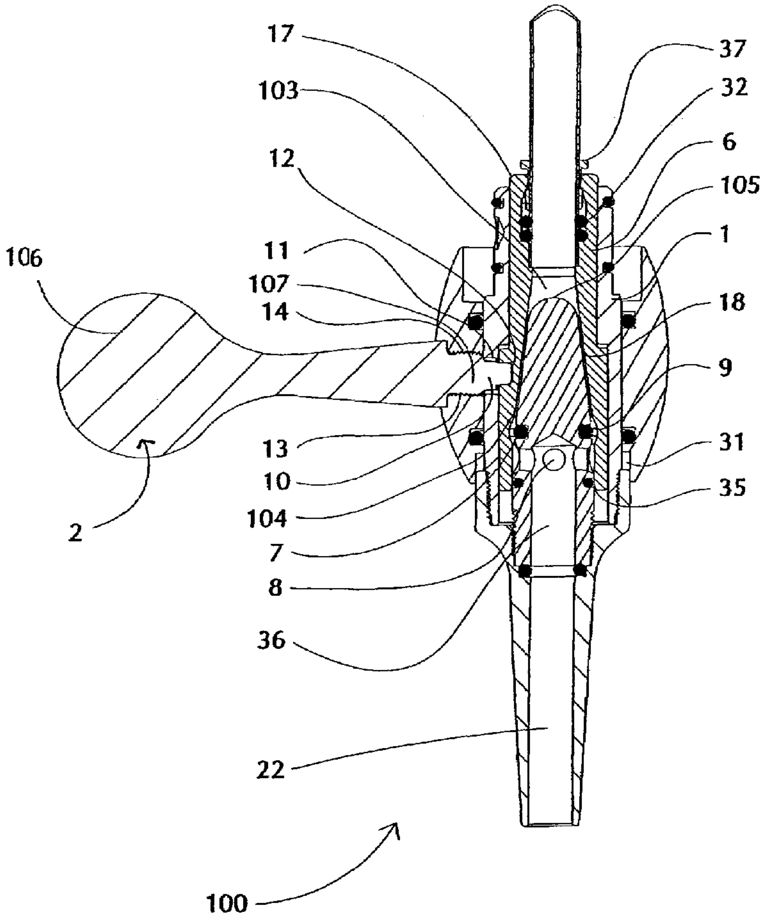
FIG. 4 is a vertical cross-section of the BDT in the open position, on a line equivalent to B-B in FIG. 3.
Figure 3:
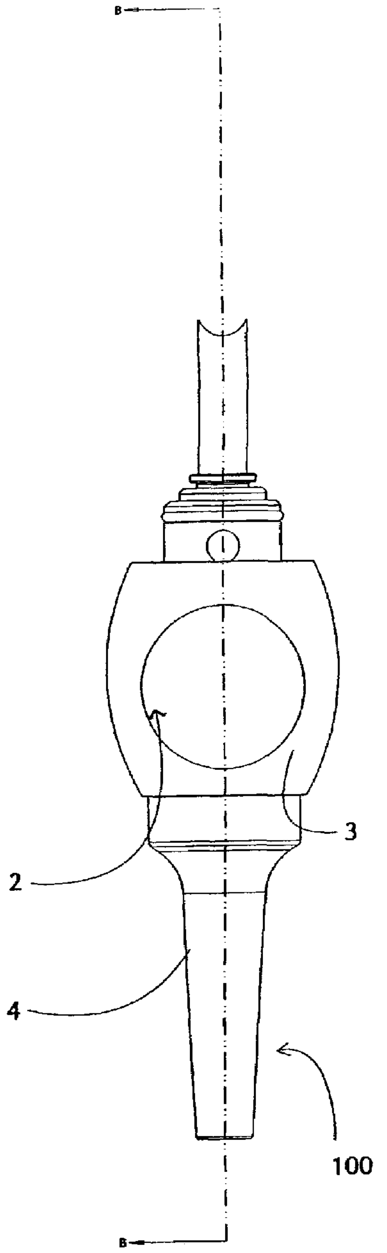
FIG. 3 is a rear elevation of the BDT in the open position.

As shown in FIGS. 2 and 4, the internal diameter of the chamber wall 102 increases in a downstream direction away from the beverage inlet port 16, 17 such that an internal tapered flow passageway 103 is formed within the female taper member 6. The maximum internal diameter of the chamber 101 has an annular circumferential recess 9 in the chamber wall 102 of the female taper member 6, providing a shoulder 104 on its rim upstream of the beverage outlet flow 22. As shown in FIG. 4 the recess 9 provides a flow passageway from the internal tapered flow passageway 103 of the female taper member 6 to the beverage outlet flow 22 when the tap is in the open position. The annular recess 9 forms part of a valve closure arrangement which prevents flow of liquid from the flow passageway 103 to the beverage outlet 22 and pouring spout 4 when the tap is in the closed position. The external surface of the female taper member 6 is provided with a pin hole 12.

With reference to FIGS. 2 and 4, a fixed male taper member 5 having a taper portion 105 is located within the tapered flow passageway 103 of the chamber 101 of the female taper member 6. As shown in FIG. 2, the male taper member 5 has an external tapered surface. The taper of the male taper member 5 increases in diameter in a direction downstream of the flow of beverage, through the chamber 101. With reference to FIG. 2, the external taper of the male taper member 5 matches the tapered flow passageway 103 of the female taper member 6 such that there is little or no gap 19 between the male taper 5 and the female taper 6 when the tap is in the closed position. The external surface of the male taper member 5 therefore abuts the wall of the chamber 101 when the tap is in the closed position. A surface seal is thereby formed between the external taper of the male taper member 5 and the chamber wall

102 of the female taper member 6. The male taper member 5 may alternatively be described as a frusto-conical plug member.

In the embodiment shown, the maximum diameter of the external taper of the male member 5 has a seal 7 upstream of the beverage outlet 22 and downstream of the taper portion (also called frusto-conical portion) 105 of the male taper member 5. The seal 7 comprises a rubber O-ring. The seal 7 forms part of a valve closure arrangement such that when the tap is in the closed position as shown in FIG. 2, the seal 7 abuts the shoulder 104 of the female taper member 6 forming a seal between the external surface of the male taper member 5 and the chamber wall 102 of the female taper member 6, stopping flow of liquid or beverage from the tapered flow passageway 103 to the beverage outlet 22 through spout 4.

As shown in FIG. 4, the male taper member 5 has a hollow outlet portion 36 downstream of the taper portion 105 which is in fluid communication with the beverage outlet 22 in the pouring spout 4. The external surface of the male taper member 5 is provided with a plurality of perpendicularly oriented cross holes 8 downstream of the seal 7 which penetrate through the male taper member 5. The holes 8 allow liquid or beverage to pass from the tapered flow passageway into the interior of the outlet portion 36 when the tap is in the open position. This arrangement provides a linear flow path from the flow passageway through the outlet portion 36 to the beverage outlet 22. Seal 35 is provided between the female taper member 6 and the male taper member 5 downstream of the cross holes 8. The seal 35 ensures that beverage does not exit the flow passageway other than through the cross holes 8.

Figure 5:
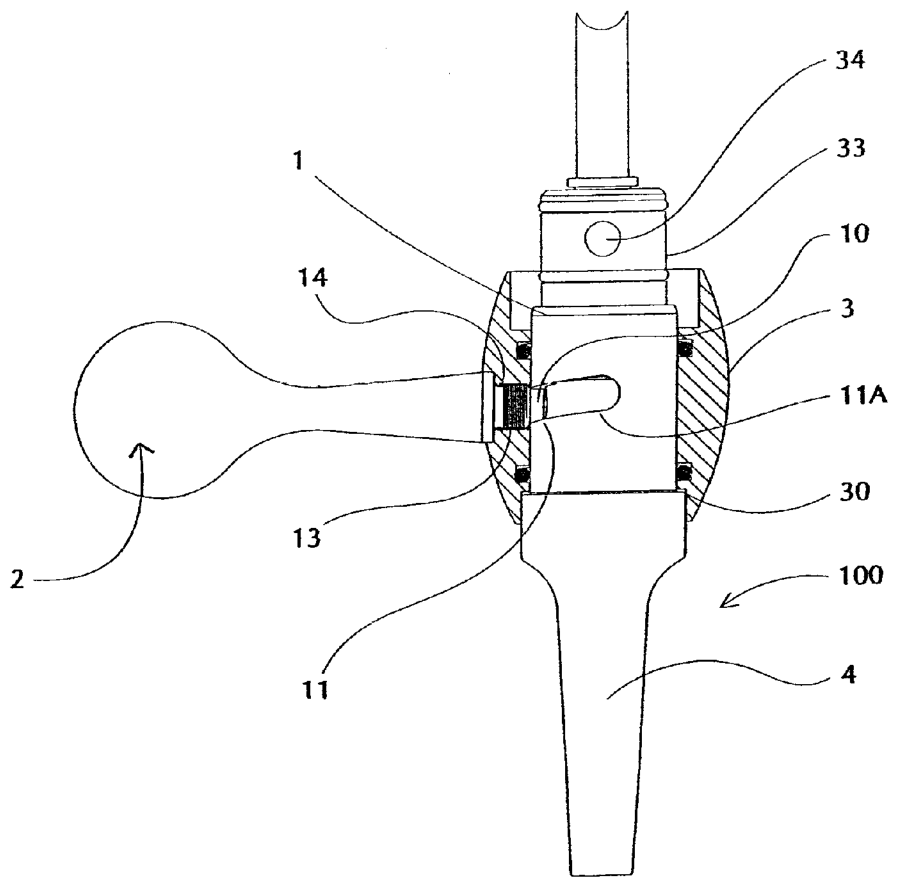
FIG. 5 is the same elevation as that shown in FIG. 2 with a partially sectioned view of the tap handle shroud and the remainder of the shroud cut away so as to show the relationship with the handle and the helical slot in the tap body.
Figure 6:
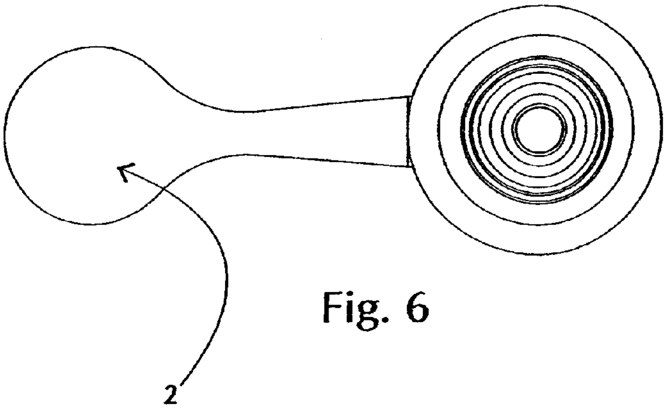
FIG. 6 is a top view of the BDT in the closed position.
Figure 7:
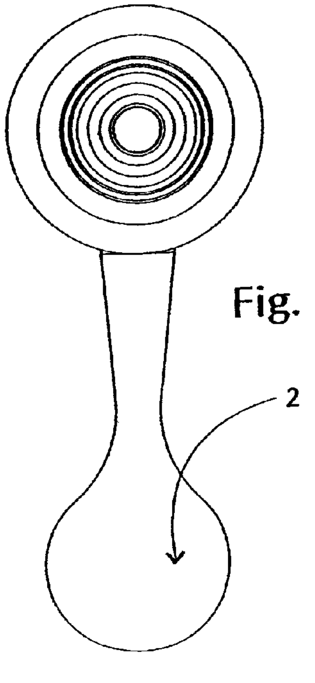
FIG. 7 is a top view of the BDT in the open position.
Figure 8:
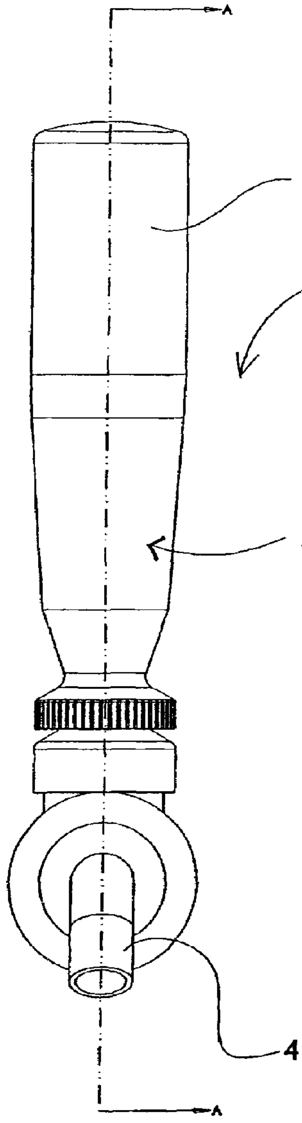
FIGS. 8 to 11 show a further embodiment of the invention in which the BDT is shown in a horizontal orientation.

With reference to FIGS. 1-5, the BDT when in a vertical orientation comprises a handle assembly mechanism 2 operable outside the valve body 1. A shroud 3 surrounds a substantial portion of the valve body 1. The shroud 3 is rotatable about the valve body 1. The handle assembly mechanism 2 is fixed to the shroud 3. The handle assembly mechanism comprises a handle 106 having an end portion 107 in the form of a cylindrical stem. As shown in FIG. 4, the end portion 107 has a male threaded portion 13 which is engaged with a corresponding female threaded portion 14 of the shroud 3. With reference to FIGS. 4 and 5, the end portion 107 is provided with a stepped pin having a circular portion 10 which acts as a cam follower and which extends through a cam surface of helical slot 11 on the exterior of the valve body 1 so that pin 15 of the end portion 107 engages the pin hole 12 in the exterior surface of the female taper member 6.

As shown in FIGS. 1-5, the BDT is provided with a pouring spout 4 through which beverage is dispensed. The pouring spout 4 is fixed to the valve body by means of a female threaded portion 26 which engages with a corresponding male threaded portion 27 on the valve body 1.

With reference to FIG. 2, the uppermost portion of the pouring spout 4 is in close proximity to the shroud 3 at position 30 when the handle is in the closed position. As shown in FIG. 4, a gap 31 is formed between the uppermost portion of the spout 4 and the handle shroud 3 when the handle is in the open position. With reference to FIGS. 2 and 4, the portion of the male taper member 5 downstream of the valve closure arrangement, protrudes from the female taper member 6 downstream of the maximum diameter of the female taper 6. The male taper member 5 is fixed to the pouring spout 4 by means of a male thread 25 which engages with female thread 24 of the pouring spout 4. A seal 23 is provided between the fixed male taper 5 and the pouring spout 4 to prevent leakage. As shown in FIG. 5, an alignment notch 34 is provided to aid correct alignment of the handle in the vertical orientation. The valve body as shown in FIG. 1 has a plain journal diameter 33 for locating the beverage supply housing. However, the skilled person will appreciate that a thread could replace the plain journal diameter so that the valve body could be thread mounted into a beverage supply housing using the conventional method popular as an industry standard.

As shown in FIGS. 1-5, the BDT is provided with a beverage inlet port 16, 17 and a beverage outlet 22 through pouring spout 4. With reference to FIGS. 1 and 2, when the handle assembly mechanism 2 is in the closed position, there is no communication between the beverage inlet port 16 and the beverage outlet 22. When the operator wishes to dispense a beverage, the handle 106 is actuated from a closed position to the open position so that the seal 7 is disengaged from the shoulder 104 as the female taper member 6 is moved upstream and beverage is allowed to flow around the seal 7 into the annular recess 9 and through the equally spaced cross holes 8 into the hollow outlet portion 36 of the male taper member 5 and exiting through pouring spout 4. As shown in FIGS. 2 and 4, the seal 35 ensures that beverage flows through the cross holes 8 and does not leak. With reference to FIG. 4, the actuation of the handle 106 to open the BDT gradually increases the parallel annular gap 18 between the matching tapers of the fixed male taper 5 and the slidable female taper 6. When the operator wishes to stop dispensing beverage, the handle 106 is actuated to close the BDT. The actuation of the handle 106 to close the BDT causes axial movement of the slidable female taper 6 in a downstream direction towards the beverage outlet 22. This movement gradually decreases the annular gap 18 between the matching tapers of the male and female taper members so that there is little or no gap 19 as shown in FIG. 2.

FIGS. 2 and 4 show the BDT in vertical orientation in the closed and open positions respectively. In the embodiment shown, in the vertical orientation, the method of opening and closing the beverage dispense tap 100 is achieved by rotating the handle 106 through an angular rotation. The handle 106 is fixed to the shroud 3 by means of corresponding male and female threaded portions as described above. A pair of wiper seals 28, 29 is provided in the handle shroud 3 to facilitate easy movement as the handle 106 rotates the handle shroud 3 on the valve body 1.

In this embodiment the handle 106 includes an end portion 107 which has a circular portion 10 that acts as a cam follower and a pin diameter 15 to engage with a pin hole 12 in the slidable female taper 6. The cam follower 10 is in co-operation with a helical slot 11 in the valve body and the pin diameter 15 is in direct communication with a pin hole 12 in the slidable female taper. When the handle 106 is rotated, the cam follower diameter portion 10 of the end portion 107 follows the cam surface of the helical slot 11. As the cam follower 10 engages with the helical slot 11, the pin diameter 15 of the end portion 107 engaged in the pin hole 12 of the slide-able female taper 6 turns the slidable female taper 6 and laterally lifts the slidable female taper 6 along the pitch of the helical slot 11, disengaging the seal 7 located on the maximum diameter of the external taper of the fixed male taper 5 with the shoulder 104 of the chamber wall 102 of the slidable female taper.

The disengaging of the seal 7 allows the liquid to flow through the annular circumferential recess 9 through into the hollow outlet portion 36 of the male taper member 6 by means of the perpendicularly located cross holes 8 in the fixed male taper 5. As the seal 7 disengages, the parallel annular gap 19 between the slidable female taper 6 and the fixed male taper 5 increases allowing the liquid flow to increase in velocity so that in the fully open position the liquid is flowing at its fastest rate of flow. As the handle 106 is closed the parallel annular gap 18 is gradually reduced diffusing the liquid flow, decelerating the liquid flow rate until the seal 7 re-engages with the shoulder 104 of the chamber wall 102 to stop the flow.

A second embodiment of the invention is shown in FIGS. 8 to 11 in which the same reference numerals are used as for the previous embodiment. The BDT 200 shown in FIGS. 8 to 11 has the same main components as the embodiment shown in FIGS. 1 to 5. The main components operate in a similar manner to that described above in relation to FIGS. 1 to 5.

The significant difference from the first embodiment shown in FIGS. 1 to 5 is that the BDT 200 is shown in horizontal orientation. The BDT operates in the same manner as the BDT in the vertical orientation such that opening and closing of the tap and control of the flow of liquid are achieved simultaneously by a single actuating means in the form of the handle assembly mechanism 2.

Figure 9:
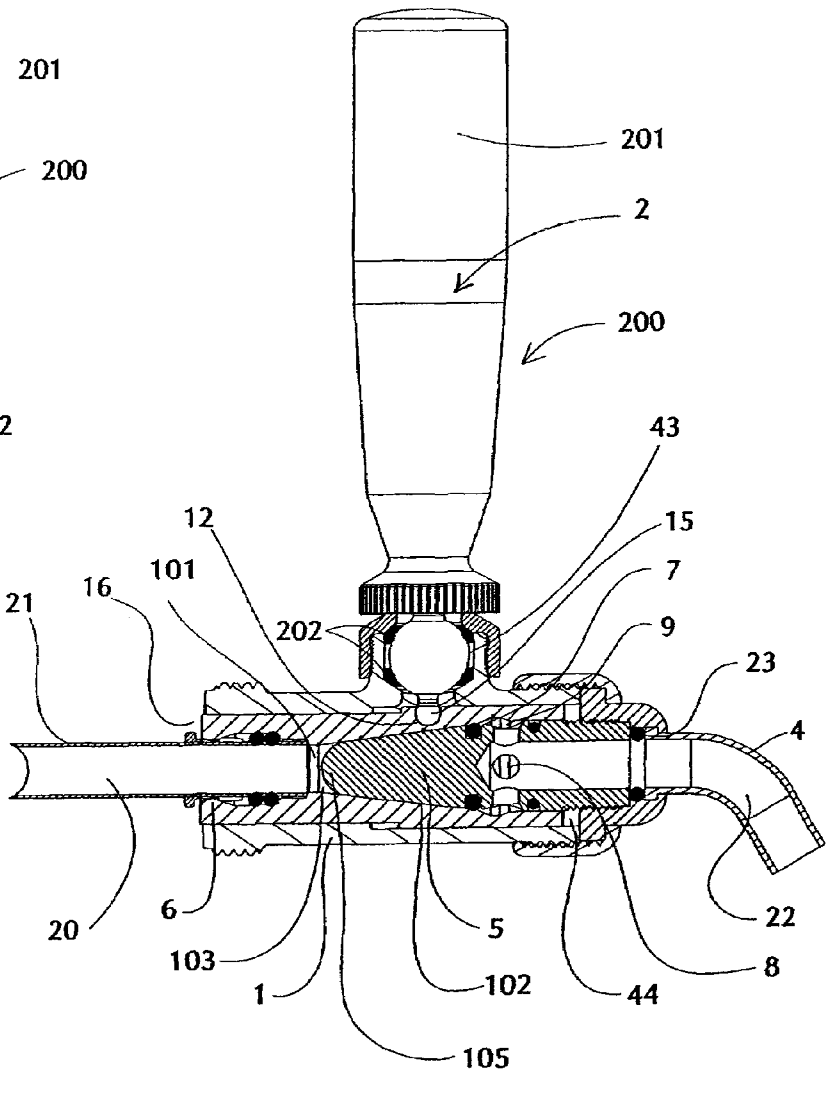
Figure 10:
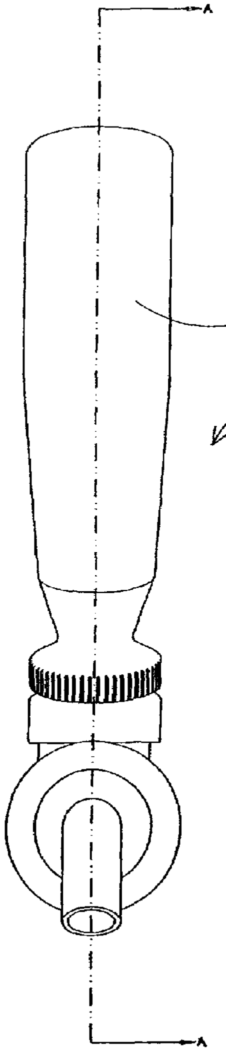
Figure 11:
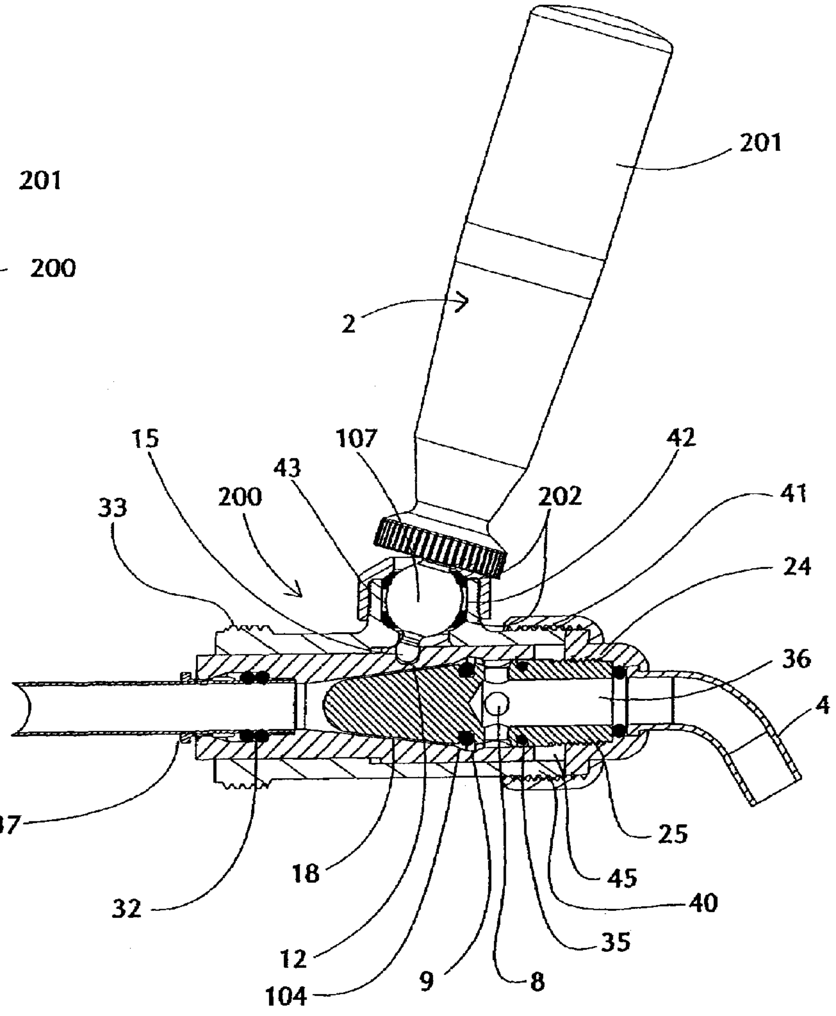

The handle assembly mechanism 2 shown in FIGS. 8 to 11 differs from that of FIGS. 1-5. The handle 201 operates in a linear movement to cause axial movement of the slidable female taper member 6. The handle assembly mechanism 2 comprises a handle 201 having an end portion 107 having a cam surface 43. The valve body 1 has a recessed port 42 which contains two split plastic brushes 202 which equally contain two internal concave surfaces that receive the spherical cam surface 43. The split plastic bushes 202 provide a wear resistant pivot point that protects the recessed port 42 allowing the spherical cam surface 43 to be moveable without causing adverse wear on the recessed port 42 whilst also ensuring smooth movement of the cam surface 43. As shown in FIGS. 9 and 11, the cam surface 43 has a pin diameter 15 extending therefrom. The pin diameter 15 engages with pin hole 12 on the external surface of the slidable female taper member 5. As shown in FIG. 11, when it is desired to dispense beverage, movement of the handle 201 is in a linear plane toward the operator of the BDT. The valve body 1 is fixed to the beverage supply housing therefore causing the cam surface 43 to pivot in the dual concave cam surfaces 42 of the plastic wear pads 202 and the pin diameter 15 engages the pin hole 12 on the external surface of the female taper member 6 such that the slidable female taper member 6 is moved upstream disengaging seal 7 located at the maximum diameter of external taper of the fixed male taper member 5 with the shoulder 104 of the chamber wall 102 of the female taper member 6.

As shown in FIG. 11, the disengaging of the seal 7 allows the liquid to flow through the annular circumferential recess 9 through into the hollow outlet portion 36 of the male taper member 5 by means of the perpendicularly located cross holes 8 in the fixed male taper 5. As the seal 7 disengages, the parallel annular gap 18 between the slidable female taper 6 and the fixed male taper 5 increases allowing the liquid flow to increase in velocity so that in the fully open position the liquid is flowing at its fastest rate of flow. As shown in FIG. 11 a gap 45 is formed between the innermost portion of the spout 4 and the outermost portion of the female taper member 6 downstream of the male taper member 5 when the tap is in the open position. With reference to FIGS. 9 and 11, as the handle 201 is closed the parallel annular gap 18 shown in FIG. 11 is gradually reduced, decelerating the liquid flow rate until the seal 7 re-engages with the shoulder 104 of the chamber wall 102 to stop the flow. As shown in FIG. 9 a minimal gap 44 is formed between the innermost portion of the spout 4 and the outermost portion of the female taper member 6 downstream of the male taper 5 when the tap is in the closed position.

The single actuating mechanism described herein allows the operator to open and close the tap while simultaneously varying the flow rate of liquid or beverage by means of the flow restrictor. The extent of movement of the handle 106, 201 controls the extent of the flow regulator effect. For example, if when the tap is opened, the liquid emerging is too frothy, the operator can immediately reduce the flow by partially closing the tap and throttling the rate of flow. There is no need for a separate control mechanism to control movement of the flow regulator (male taper member).

In the embodiments described herein, all components in contact with liquid (other than seals) are composed of food grade austenitic stainless steel, although a food grade polymer material, such as polycarbonate or polyacetal, could be used.

The table below details the relationship between the reference numerals and their components:

1. valve body
2. handle assembly mechanism
3. handle shroud on vertically oriented BDT
4. pouring spout
5. fixed male taper
6. slide-able female taper
7. liquid flow seal
8. perpendicularly located series of cross holes
9. annular circumferential recess
10. cam follower diameter portion
11. cam surface of helical slot [11A uppermost surface of helical slot]
12. pin hole in slide-able female taper
13. male threaded portion of cylindrical stem
14. female threaded portion of handle shroud
15. pin diameter
16. position of beverage inlet port of slide-able female taper in closed position
17. position of beverage inlet port of slide-able female taper in open position
18. parallel annular gap between fixed male taper and slide-able female taper in open position
19. diminutive or nil gap between fixed male taper and slide-able female taper in closed position
20. beverage inlet flow through beverage supply line
21. beverage supply line
22. beverage outlet flow through pouring spout
23. seal between fixed male taper and pouring spout
24. female thread in pouring spout to attach male thread of fixed male taper
25. male thread of fixed male taper to attach into female thread of pouring spout
26. female thread in pouring spout to attach to male thread of valve body
27. male thread of valve body to attach to female thread in pouring spout
28. one of a pair of wiper seals internally located in the handle shroud to facilitate easy movement as the handle assembly mechanism turns the handle shroud on the mating valve body diameter
29. second seal as 28
30. position of the uppermost part of the pouring spout when the handle shroud is in the closed position
31. evident gap between the uppermost part of the pouring spout when the
handle shroud is in the open position
32. pair of seals sealing the beverage supply line in the slide-able female taper
33. connection journal of the valve body to locate in the beverage supply housing
34. alignment notch used in conjunction with connection journal to correctly align the handle position in the vertically oriented option 35. seal between slidable female taper and fixed male taper to ensure liquid cannot exit valve body other than through perpendicular series of cross holes
36. beverage outlet port in the fixed male taper
37. John Guest collet connecting beverage supply line
38. Threaded location to connect to beverage supply housing
39. Spout locking nut
40. Male thread on valve body to attach spout locking nut 39
41. Female thread on spout locking nut 39 to attach to male thread on valve body 40
42. Recessed port in handle location point of valve body to allow linear forward/backward movement of handle assembly and location of split concave plastic bushing 202
43. Spherical contour of handle assembly cam surface that pivots forward/backward in concave cam surfaces of split concave plastic bushing 202
44. Minimal gap when slide-able female taper is in the forward and fully closed position
45. Maximum gap when slide-able female taper is in the backward and fully open position
100. Beverage Dispense Tap in vertical orientation
101. Internal Chamber in female taper member
102. Chamber wall
103. Tapered flow passageway
104. Shoulder on chamber wall 102
105. Spherical end of taper portion of male taper member
106. Handle
107. End portion of handle
200. Beverage Dispense Tap in horizontal orientation
201. Handle
202. Split pair of concave plastic bushings The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A beverage dispense valve comprising
(i) a valve body;
(ii) a female taper member inside the valve body and defining an internal chamber in fluid communication with a beverage inlet port and a beverage outlet port; the internal diameter of the chamber increasing in a downstream direction away from the beverage inlet port;
(iii) a male taper member having a taper portion receivable in said internal chamber, the external diameter of the taper portion increasing in a downstream direction so as to be at least partially complementary to the female taper member, and having a hollow outlet portion downstream of the taper portion, one taper member being slidable relative to the other so that a flow passageway can be formed in an annular gap between them, the flow passageway providing a restrictive diffusing flow path for beverage and the two taper members forming a flow regulator;
(iv) one or more apertures penetrating through the male taper member to allow beverage to pass from the flow passageway into the interior of the outlet portion,
(v) a valve closure arrangement for sealing flow between the beverage inlet port and the beverage outlet port; and
(vi) an actuating mechanism outside the valve body to operate both the flow regulator and the valve closure arrangement; wherein said valve closure arrangement is located at or adjacent to the maximum external diameter of the male taper member so that in its closed position the closure arrangement seals the flow passageway at the downstream end of the diffusing flow path but upstream of the apertures(s) which penetrate through the male taper member.

2. A beverage dispense valve according to claim 1 wherein the valve closure arrangement comprises a resilient sealing member protruding from the male taper member at or adjacent to its maximum diameter to seal against a valve seat on the chamber wall of the female taper member.

3. A beverage dispense valve according to claim 2 wherein said valve closure arrangement further comprises an annular recess in the chamber wall of the female taper member at or adjacent to the maximum internal diameter of the chamber, the recess providing a shoulder on its upstream rim, so that in the closed position the resilient sealing member seals against the shoulder and in the open position the flow passageway extends past the sealing member in the gap defined by the recess.

4. A beverage dispense valve according to claim 1 wherein said valve closure arrangement comprises a resilient sealing member protruding from the female taper member at or adjacent to its maximum internal diameter to seal against the maximum external diameter of the male taper member.

5. A beverage dispense valve according to claim 1 wherein a linear flow path is provided through the outlet portion of the male taper member to the beverage outlet port.

6. A beverage dispense valve according to claim 1 wherein the female taper member is moveably located within the valve body and the male taper member is fixed to the valve body.

7. A beverage dispense valve according to claim 1 wherein the actuating mechanism is a handle assembly mechanism.

8. A beverage dispense valve according to claim 7 wherein the valve body has an opening through which the handle assembly mechanism engages the moveable female taper member.

9. A beverage dispense valve according to claim 7, wherein the handle assembly mechanism is adapted to operate both the flow regulator and the valve closure arrangement by means of angular rotation of the handle assembly mechanism relative to the valve body.

10. A beverage dispense valve according to claim 9, wherein the handle assembly mechanism comprises a handle having an end portion which passes through an opening in the valve body to engage said female taper member.

11. A beverage dispense valve according to claim 10 wherein the valve body has a helical slot through which the end portion of the handle can pass.

12. A beverage dispense valve according to claim 11 wherein the exterior surface of the female taper member comprises a recess for engagement with the end portion of the handle.

13. A beverage dispense valve according to claim 12 wherein the end portion of the handle comprises a cam follower for co-operation with said helical slot and a pin for engagement with the female taper member such that on rotation of said handle, the cam follower is guided by the helical slot and the pin engages the recess on the external surface of the female taper member such that the female taper is moved upstream or downstream and rotated as the cam follower moves along the helical slot.

14. A beverage dispense valve according to claim 1, further comprising a shroud outside the valve body and on which the handle is mounted, said shroud being rotatable about the valve body.

15. A beverage dispense valve according to claim 1 wherein the handle mechanism assembly is adapted to operate the flow regulator and the valve closure arrangement by means of linear movement of the handle relative to the valve body.

16. A beverage dispense valve according to claim 15 wherein the handle assembly mechanism comprises a handle having an end portion which passes through an opening in the valve body to engage said female taper member.

17. A beverage dispense valve according to claim 16 wherein the valve body has a concave cam surface adapted to receive the end portion of the handle mechanism assembly.

18. A beverage dispense valve according to claim 17 wherein the exterior surface of the female taper member comprises a recess for engagement with the handle mechanism assembly.

19. A beverage dispense valve according to claim 18 wherein the end portion of the handle comprises a cam for co-operation with the concave cam surface of the valve body and a pin extending from said cam for engagement with the female taper member such that on linear movement of said handle, the cam pivots in the concave cam surface and the pin engages the recess on the external surface of the female taper member such that the female taper is moved upstream or downstream as the cam pivots in the concave cam surface.

20. A beverage dispense valve according to claim 1 further comprising a beverage dispense spout fixed to the male taper member forming a male taper member/spout assembly.

21. A beverage dispense valve according to claim 20 wherein the female taper member is fixed to the valve body and the male taper member/spout assembly is slidable relative to the female taper member; and wherein the actuating mechanism is adapted to operate both the flow regulator and valve closure arrangement by moving the male taper member/spout assembly relative to the fixed female taper member.

* * * * *